United States Patent [19]

Wacker

[11] 4,305,475
[45] Dec. 15, 1981

[54] WEIGH BLOCK ASSEMBLY

[75] Inventor: Robert L. Wacker, Wellington, Ohio

[73] Assignee: Quest Corporation, Macedonia, Ohio

[21] Appl. No.: 111,995

[22] Filed: Jan. 14, 1980

[51] Int. Cl.³ .................... B66C 1/40; G01G 21/22
[52] U.S. Cl. .................................. 177/147; 177/263
[58] Field of Search .............................. 177/147, 263

[56] References Cited

U.S. PATENT DOCUMENTS

| | | | |
|---|---|---|---|
| 2,820,624 | 1/1958 | Koegel | 177/147 |
| 3,080,935 | 3/1963 | Abbonizio et al. | 177/147 |
| 3,081,833 | 3/1963 | Kester | 177/147 |
| 3,095,057 | 6/1963 | Kraeling | 177/147 |
| 3,899,034 | 8/1975 | Polen et al. | 177/147 X |
| 4,102,295 | 7/1978 | Crook, Jr. et al. | 177/147 X |
| 4,148,219 | 4/1979 | Golding et al. | |
| 4,153,123 | 5/1979 | Bereyziat | 177/147 |

Primary Examiner—George H. Miller, Jr.
Attorney, Agent, or Firm—Pearne, Gordon, Sessions, McCoy & Granger

[57] ABSTRACT

A weigh block assembly is disclosed which utilizes compression load-measuring means interposed between a lower plate attached to and supported by a supporting housing and an upper plate attached to the load to be carried and weighed. The upper plate is freely supported on top of the load-measuring means without lateral restraint so that horizontal forces are not absorbed and the pure vertical force is sensed by the load-measuring means and the weighing inaccuracies and other undesirable and unpredictable effects caused by horizontal restraints on the upper plate are eliminated.

14 Claims, 3 Drawing Figures

WEIGH BLOCK ASSEMBLY

BACKGROUND OF THE INVENTION

1. Field of the Invention

This invention relates to a block assembly having a weighing means incorporated therein, and particularly to such an assembly having compression load measuring means.

2. Description of the Prior Art

Block assemblies incorporating weighing means have generally used two types of weighing means or load cells. These assemblies have used either compression-type load cells or extension-type load cells. Weigh block assemblies using extension-type load cells generally comprise connecting the load directly to one end of the load cell while supporting the other end of the load cell in the support housing which may be attached to, for example, a sheave basket. Among the disadvantages of this arrangement are the possibility of the complete failure of the block as a load-carrying device upon failure of the load cell if adequate safety restraints are not included. If the load exceeds the load rating of the load cell and the extension load cell fails, it is possible that the entire block assembly may fail and the load connected to the lower end of the load cell may be dropped.

The weigh block assemblies incorporating compression-type load cells generally mount the compression load cell between an upper member attached to the load-carrying element and a lower member secured to the housing, so that the compression-type load cell is compressed between the members as the weigh block assembly is loaded. This arrangement reduces the possibility of load failure upon failure of the load cell. If the load cell fails, the loading member may engage the supporting member to avoid dropping the load from the assembly.

Examples of weigh block assemblies incorporating compression-type load cells are shown in the following U.S. Pat. Nos. 2,820,624 issued to Koegel; 3,080,935 issued to Abbonizio et al.; 3,081,833 issued to Kester; and 3,095,057 issued to Kraeling.

In the past, these weigh block assemblies using compression type load cells have included means to prevent lateral or side loading on the load cells. For example, in the patent issued to Kester, a pair of flat leaf springs are provided on each side of the upper member to prevent lateral movement of the upper member. Other weigh block assemblies have used flexure plates or check rods to stabilize the upper member and to reduce or eliminate side-loading effects on the upper member. These lateral restraints have had an adverse effect on the accuracy of the load cells in measuring the weight of the load attached to the block. The flexure plates or check rods were designed with the intent of absorbing all side loads without absorbing an excessive amount of vertical load, but in practice, the lateral restraints did absorb a certain portion of the vertical load, resulting in inaccurate measurements. In addition, absorption of the vertical load in a nonlinear or nonrepeatable fashion would add to the unreliability of the system since the sensed weight would become erratic and unpredictable. In addition, many times the flexure plates or check rods become loose due to vibrations and shocks experienced by the assembly causing a change in the original predicted value of the load being absorbed.

SUMMARY OF THE INVENTION

These and other disadvantages of the weigh block assemblies of the prior art are overcome by the present invention. The present invention comprises a weigh block assembly utilizing compression load-measuring means in which the upper member or plate which supports the load and which bears upon the load-measuring means is freely mounted without any lateral restraint to restrain horizontal forces which may be transmitted to the load-measuring means and which may affect the vertical force on the load-measuring means, resulting in a higher accuracy of the loading measurements from the system, since the full vertical force will be sensed by the load-measuring means. In addition, since horizontal restraining means, such as flexure plates or check rods, are eliminated, the additional problems of such restraints becoming loose and causing a change in the original predicted value of the load being absorbed are eliminated.

The present invention overcomes the problems of the prior art by utilizing center-loaded type load beam tranducers that have side loading capabilities of 100% of the load beam full scale capacity. The use of such a load beam eliminates the need for flexure plates and/or check rods which were necessary with conventional weigh block load cells because any amount of side loading on these conventional load cells would degrade the accuracy of the system and possibly damage the load cells. The elimination of the flexure plates and check rods from the weigh block assembly design increases the overall system accuracy by eliminating the inherent inaccuracies introduced by these restraints.

The weigh block assembly of the present invention also has other advantages. The design of the weigh block assembly of the present invention is relatively simple with a minimum number of parts, thereby reducing the possibilities of failure of elements which may have an effect on the weigh system performance. The minimum number of parts also results in an assembly which is relatively easy to maintain. If failure does occur, it is easy to trouble-shoot. Also, the load beams and the associated hardware are easily accessible for inspection or replacement, resulting in a minimum amount of down time. In addition, due to the minimum number of parts utilized, the weigh block assembly is relatively inexpensive and the initial engineering design cost as well as the production cost of the assembly are minimized.

The basic weigh block assembly of the present invention is highly flexible in design and may be adapted for single or multiple sheave assemblies, making it possible to retrofit the weigh block into existing crane installations. The assembly is compact in design and the load beams used as the preferred weighing device have a low profile design, minimizing the height of the weigh block assembly.

These and other advantages are accomplished by the material handling and weighing assembly of the present invention which comprises a lower plate attached to and supported by a supporting housing. Supported on the lower plate is a compression load-measuring means, which preferably may include a plurality of compression load cells which may be laterally spaced on the lower plate. An upper plate is freely supported on top of the load-measuring means without lateral restraint. A shank is supported at its upper end by engagement with the upper plate and has at its lower end means for attaching the shank to a load to be handled and weighed. The shank extends freely downwardly from its engagement with the upper plate without restraint to hinder its lateral deflection.

Preferably, the compression load cells used in the present invention are center-loaded bending beam load cells capable of absorbing side loading equal to their full scale load capacity without permanent damage.

DETAILED DESCRIPTION OF THE PREFERRED EMBODIMENTS

Figure 1:
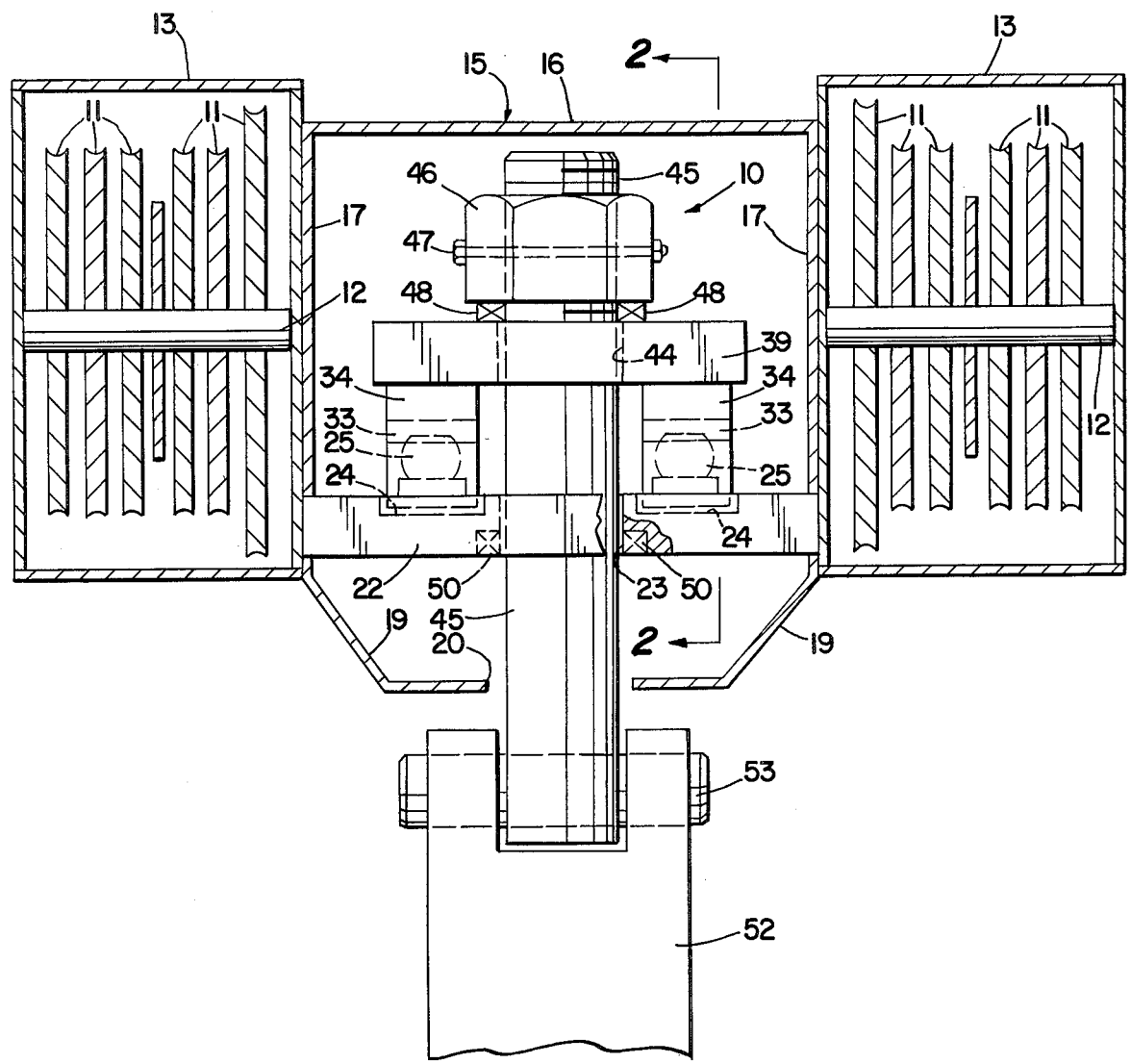
FIG. 1 is a front elevational view of the weigh block assembly of the present invention.
Figure 2:
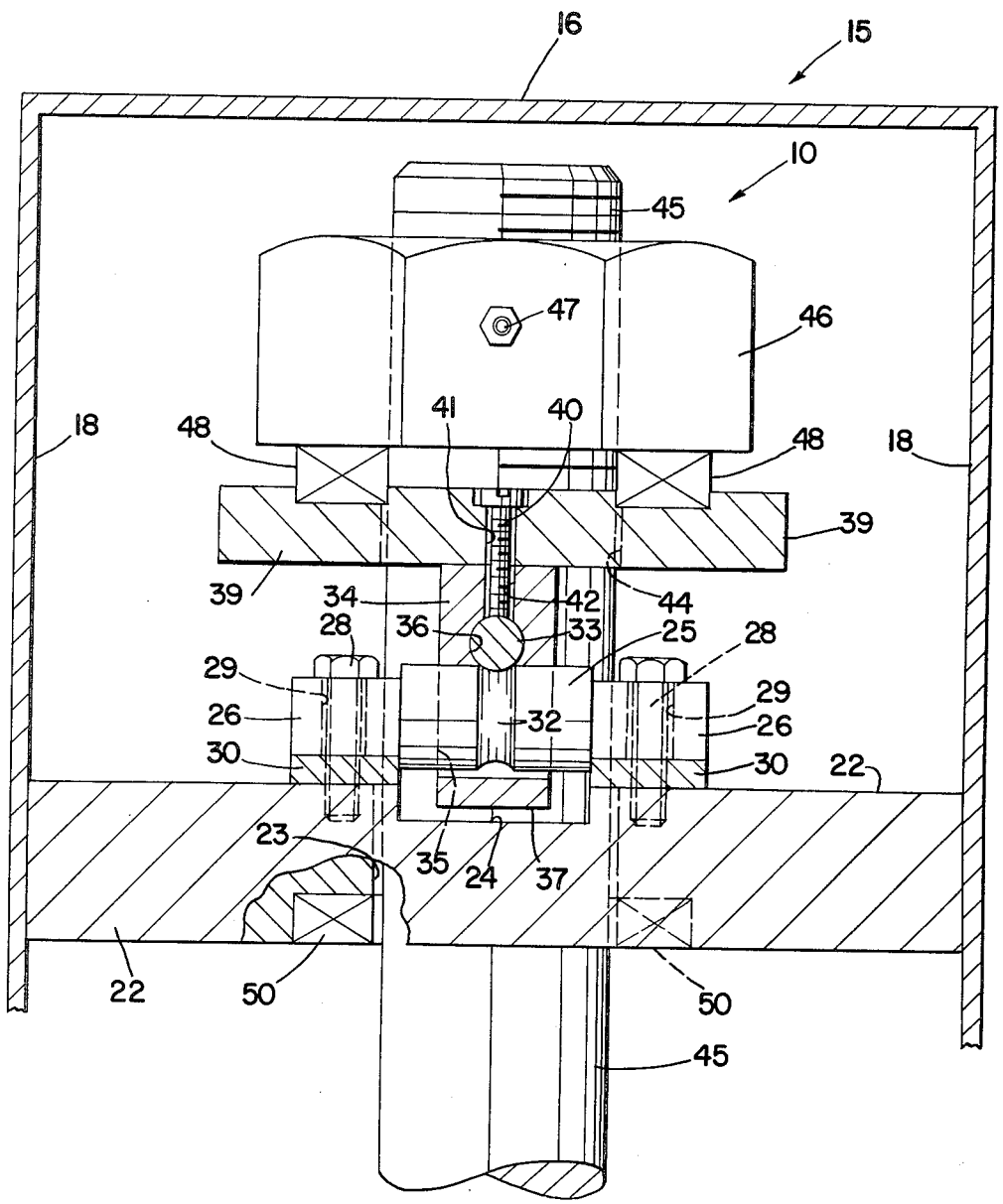
FIG. 2 is a side sectional view of the weigh block assembly taken along line 2—2 of FIG. 1.

Referring initially to FIGS. 1 and 2, there is shown a weigh block assembly 10 of the present invention embodied in a multiple sheave assembly. The assembly is typically supported by hoisting lines (not shown) engaged by two sets of sheaves 11 (FIG. 1). Each set of sheaves 11 is mounted on a sheave pin 12 and enclosed in a sheave basket 13. The sheave basket 13 has sides for supporting the pin 12 and an open top through which the hoisting lines extending from the sheaves 11 extend.

The weigh block assembly 10 is supported between two sheave baskets 13 in a housing 15. The housing 15 comprises a horizontally extending top 16 supported on a pair of vertically extending side walls 17 and a pair of vertically extending front and back walls 18 (FIG. 2) and a bottom 19 (FIG. 1) having a central opening 20. Each of the housing side walls 17 is welded or otherwise secured to the sides of one of the sheave baskets 13 so that the housing 15 is supported between the sheave baskets.

A lower plate or load plate 22 (FIGS. 1 and 2) extends horizontally across the bottom portion of the housing 15 between the side walls 17 and between the front and back walls 18. The load plate 22 is supported on each side by attachment to the side walls 17 and the sheave baskets 13. The load plate 22 has a vertically extending central opening 23. On the top surface of the load plate 22 is a pair of recesses 24.

A pair of load cells, each comprising a load beam transducer 25, is supported on the load plate 22 with each load cell located at one of the recesses 24. As shown in FIG. 2, each of the load beam transducers 25 has a pair of mounting portions 26 extending on each end to the front and rear of the weigh block assembly. Each load beam transducer 25 is attached to the load plate 22 by a pair of mounting bolts 28. Each of the bolts 28 extends through an opening 29 in one of the mounting portions 26 of the load beam transducer 25 and is threaded into a load beam mounting plate 30 and into a threaded opening in the load plate 22. Two load beam mounting plates 30 are thus provided for each of the load beam transducers 25 and are mounted at each end of the load beam transducers adjacent to the recesses 24 in the load plate. Each load beam transducer 25 extends between the mounting plates 30 and across the recess 24. Preferably, the openings 29 in each of the mounting portions 26 of the load beam transducers 25 are larger than the bolts 28 so that ample clearance is provided between the inside diameter of the opening and the outside diameter of the mounting bolts to allow the load beam to deflect horizontally upon loading without contacting the mounting bolts 28. As the load beam experiences vertical loading, it deflects vertically so that the horizontal distance between its ends becomes shorter. The clearance between the bolts 28 and the openings 29 allows this shortening effect to occur without placing horizontal restraints on the load beam transducer 25.

Each of the load beam transducers 25 is preferably a center-loaded type load beam transducer that has side loading capabilities of 100% of the load beam full scale capacity. This type of center-loaded bending beam is capable of withstanding side loading equal to the full scale load capacity without experiencing permanent damage. These load beams basically comprise double shear beams with a double-ended transducer and are sometimes utilized for high capacity platform scales. An example of a suitable load beam transducer is the Model 5103 Load Cell, manufactured by Transducers, Inc. of Cerritos, California.

As shown in FIG. 2, each load beam transducer 25 has a center circumferential groove 32 around the middle of the load beam. A hardened load rod 33 is positioned within the groove 32 of each of the load beam transducers 25. The load rod 33 has an outer diameter equal to the diameter of the groove 32, so that the rod is seated in the groove. The load rod 33 is maintained in position within the groove 32 by a load beam collar 34. The collar 34 has a horizontal opening or bore 35 in which the load beam transducer 25 is mounted and has another opening 36 transverse to the bore 35 through which the hardened load rod 33 is mounted. The bottom 37 of the load beam collar 34 extends into the recess 24 of the load plate 22. Clearance is provided between the bottom 37 of the load beam collar and the top surface of the recess 24 so that the load beam collar 34 is supported on the load beam transducer 25 rather than directly on the load plate 22.

An upper plate or bearing plate 39 (FIGS. 1 and 2) is supported on top of the load beam collars 34. The bearing plate is fastened to each of the collars 34 and to each of the load rods 33 by collar fastening bolts 40 (FIG. 2). Each of the bolts 40 extends through a countersunk hole 41 in the bearing plate 39 and through a coaxial hole 42 in the load beam collar 34 and extends into a short hole in the load rod 33. A clearance is provided between the inside diameter of the holes 41 and 42 and the outside diameter of the collar fastening bolt 40 so that the bolts 40 do not absorb any horizontal force which is exerted on the bearing plate 39 and which is applied from the bearing plate to the load beam collar 34 and to the load beam transducers 25.

The bearing plate 39 extends horizontally in the housing 15 parallel to and above the load plate 22, and has a central opening 44 coaxial with the central opening 23 in the load plate. The openings 23 and 44 are provided for the upper portion of a shank 45 which extends from the weigh block assembly downwardly through the opening 20 in the housing bottom 19 (FIG. 1) for the support of the load to be carried and weighed by the weigh block assembly. A shank nut 46 is threaded onto the top portion of the upper shank 45. The shank nut 46 is secured onto the upper shank 45 by an elongated keeper bolt 47 (FIG. 1) which extends through coaxial openings extending diametrically across both the shank nut 46 and the upper shank 45 to prevent the nut from turning off the shank due to rotation of the shank. The shank nut 46 is supported on top of the bearing plate 39.

A self-aligning thrust bearing 48 is interposed between the bottom of the shank nut 46 and the top of the bearing plate 39 to permit free rotation of the shank nut and thus to permit free rotation of the upper shank 45 while preventing inaccuracies in the weighing of the load on the shank due to torsional loading of the load beam transducers 25.

The bearing plate 39 is thus freely supported on top of the load beam collars 34 without any horizontal restraint to prevent horizontal movement of the plate 39 if the upper shank 45 transmits such horizontal forces through the shank nut 46. Since no horizontal forces are absorbed, the free vertical force produced by the load on the upper shank 45 is transmitted to the load beam transducers 25.

The upper shank 45 extends downwardly from the shank nut 46 through the central opening 44 in the bearing plate 39 and through the central opening 23 in the load plate 22. The inside diameter of the openings 23 and 44 is greater than the outside diameter of the upper shank 45 to provide a horizontal clearance between the upper shank and the plates 22 and 39, so that no horizontal forces are absorbed by the plates upon horizontal deflection of the upper shank 45. A lower bearing 50 is mounted within a groove in the bottom portion of the opening 23 in the load plate 22 to facilitate free rotation of the upper shank 45 and to restrain excessive lateral movement of the upper shank during unusual horizontal deflections of the shank which may result in cocking or tipping of the load beam assembly. Clearance is also provided between the inside diameter of the lower bearing 50 and the outside diameter of the upper shank 45, so that the bearing 50 does not absorb any vertical forces during normal operation of the weigh block assembly.

Below the weigh block assembly 10, the upper shank 45 is connected to a conventional lower shank 52 by a swivel pin 53 (FIG. 1). The lower shank 52 may be provided at the bottom with a hook (not shown) to which loads are attached in a conventional manner. The swivel pin 53 allows the lower shank 52 and the hook at the bottom thereof to swing freely without disturbing the interface between the upper shank 45 and the load beam transducers 25, thereby maintaining a pure vertical load on the load beam transducers.

If the ultimate load rating of the load beam transducers 25 is exceeded for any reason and the load beams experience a catastrophic failure, the load on the lower shank 52 will still be supported by the weigh block assembly. In the event of such a catastrophic failure, the load beam collar 34 will drop until the bottom 37 of the load beam collar engages the top surface of the recess 24 of the load plate 22 (see FIG. 2). Since only a small clearance is provided between the bottom 37 of the load beam collar and the top surface of the recess 24, failure of the load beam transducer 25 results in only a small vertical displacement of the upper shank 45 and the lower shank 52. Therefore, the capacities of the load beam transducers 25 can be chosen closer to the rating of the capacity of the crane without violating the required overload rating of the block assembly. This results in a higher accuracy of the system, since lower capacity and more sensitive load beam transducers may be utilized.

Figure 3:
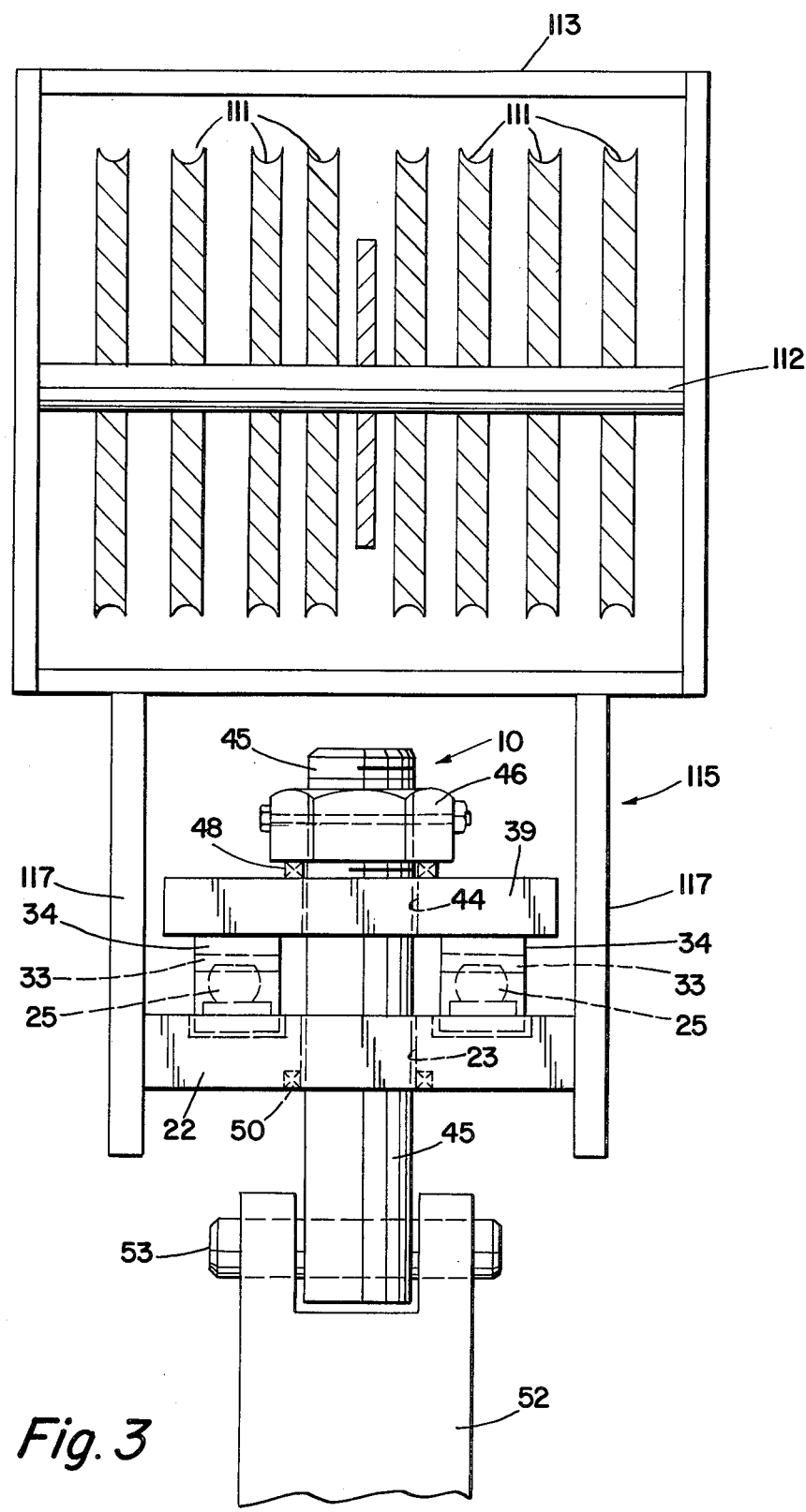
FIG. 3 is a front elevational view similar to FIG. 1 of another embodiment of the present invention utilizing the weigh block assembly with a single sheave.

While the invention has been shown and described with respect to a particular embodiment thereof, other modifications will be apparent to those skilled in the art. For example, the weigh block assembly of the present invention may also be used with more or fewer sheave assemblies. An example of a weigh block assembly used in association with a single sheave assembly is shown in FIG. 3. In this embodiment, a plurality of sheaves 111 are mounted on a sheave pin 112 and enclosed in a single sheave basket 113. The weigh block assembly 10 is supported beneath the sheave basket 113 within a housing 115 comprising a pair of side walls 117. The lower plate or load plate 22 is supported between the side walls 117. The load beam transducers 25 are supported on top of the load plate 22 as previously described with respect to FIG. 2, and the upper bearing plate 39 is supported on top of the load beam transducers 25 using the assembly of hardened load rods 33 and the load beam collars 34. The upper shank 45 extends through the central opening 44 in the bearing plate 39 and through the central opening 23 in the load plate 22 and has a shank nut 46 mounted at the top thereof. The shank nut 46 rests on top of the bearing plate 39 with a self-aligning thrust 48 interposed therebetween. The lower bearing 50 is also provided in the central opening 23 in the load plate 22. As before, clearances are provided between the upper shank 45 and the openings 23 and 44 to avoid the absorption of vertical forces. The lower shank 52 is connected to the upper shank 45 by a swivel pin 53.

Other variations are also possible. For example, more or fewer load beams may be used. In the preferred embodiment of the invention as described, two load beam transducers 25 are utilized. However, it will be apparent to those skilled in the art that a greater number of load beam transducers or other types of load cells may be used with the load cells horizontally spaced around the central opening 23 in the load plate 22.

Various other modifications apparent to those skilled in the art may be made in the apparatus disclosed above, and changes may be made with respect to the features disclosed, provided that the elements set forth in any of the following claims or the equivalents of such may be employed.

What is claimed is:

1. A material handling and weighing assembly, which comprises:
    a lower plate attached to and supported by a supporting housing;
    electronic compression load-measuring means supported on the lower plate;
    an upper plate freely supported on top of the load-measuring means without lateral restraint; and
    a shank supported at its upper end by engagement with the upper plate and having at its lower end means for attaching to a load to be handled and weighed, the shank extending freely downwardly from its engagement with the upper plate without restraint to hinder its lateral deflection.

2. A material handling and weighing assembly as in claim 1, comprising in addition a bearing interposed between the upper end of the shank and the upper plate to permit free rotation of the shank.

3. A material handling and weighing assembly as in claim 1, wherein the shank has at its upper end a nut supported on the top of the upper plate.

4. A material handling and weighing assembly as in claim 1, comprising in addition means attached to the upper plate for engaging the lower plate upon failure of the load-measuring means.

5. A material handling and weighing assembly as in claim 1, wherein the electronic load-measuring means comprises a plurality of compression load cells supported on the lower plate.

6. A material handling and weighing assembly as in claim 5, wherein the load cells are center-loaded bending beam load cells capable of absorbing side loading equal to their full scale load capacity without permanent damage.

7. A material handling and weighing assembly as in claim 1, wherein the lower plate and the upper plate each have a central opening through which the shank extends, and a clearance is provided between the shank and the inside of the central opening in the load plate to permit unhindered lateral deflection of the shank.

8. A material handling and weighing assembly as in claim 7, wherein the electronic load-measuring means comprises a plurality of compression load cells rigidly mounted on the lower plate and laterally spaced symmetrically around the central opening in the lower plate.

9. A weigh block assembly, which comprises
   a load plate attached to and supported by a sheave basket assembly, the load plate having a central opening;
   a plurality of electronic compression load cells supported on the load plate and laterally spaced symmetrically around the central opening in the load plate;
   a bearing plate freely supported on top of the load cells without lateral restraint and having a central opening generally coaxial with the central opening of the load plate; and
   a shank having at its upper end means extending radially outwardly from the shank and resting on top of the bearing plate, a bearing being interposed between the radially outwardly extending means and the bearing plate to permit free rotation of the shank, the shank extending downwardly through the central openings in the load plate and the bearing plate, the lower end of the shank having means for attaching to a load to be handled and weighed, a clearance being provided between the shank and the inside of the central opening in the load plate to permit unhindered lateral deflection of the shank.

10. A weigh block assembly as in claim 9, wherein the electronic load cells are center-loaded bending beam load cells capable of absorbing side loading equal to their full scale load capacity without permanent damage.

11. A weigh block assembly as in claim 9, wherein the upper portion of the shank is connected to the lower portion of the shank by swivel means to permit free pivoting of the attaching means at the lower end of the shank.

12. A weigh block assembly as in claim 9, wherein the radially outwardly extending means on the shank comprises a nut threaded on the upper portion of the shank.

13. A weigh block assembly as in claim 9, comprising in addition collar means attached to the bearing plate for engaging the load plate upon failure of the compression cells to support the load thereupon.

14. A weigh block assembly, which comprises:
   a generally horizontally extending load plate attached to and supported by a sheave basket assembly, the load plate having a central opening;
   a plurality of compression load cells rigidly mounted on the load plate and horizontally spaced symmetrically around the central opening in the load plate, the load cells being center-loaded bending beam load cells capable of absorbing side loading equal to their full scale load capacity without permanent damage;
   a bearing plate freely supported on top of the load cells without lateral restraint and having a central opening generally coaxial with the central opening in the load plate;
   a collar attached to the bearing plate for engaging the load plate upon failure of the load cells; and
   a shank having at its upper end a nut resting on top of the bearing plate, a self-aligning thrust bearing being interposed between the nut and the bearing plate to permit free rotation of the shank, the shank extending downwardly through the central openings in the load plate and the bearing plate, a lower bearing being provided in the central opening in the load plate to absorb excessive horizontal deflection of the shank, a clearance being provided between the shank and the inside of the lower bearing to permit unhindered lateral deflection of the shank, the shank having at its lower end a hook means for attaching to a load to be handled and weighed, the upper portion of the shank connected to the lower portion of the shank by a swivel pin to permit free pivoting of the hook at the lower end of the shank.

* * * * *

UNITED STATES PATENT AND TRADEMARK OFFICE
CERTIFICATE OF CORRECTION

PATENT NO. : 4,305,475
DATED : December 15, 1981
INVENTOR(S) : Robert L. Wacker

It is certified that error appears in the above—identified patent and that said Letters Patent is hereby corrected as shown below:

Column 6, line 20 "bearing" should be inserted after "thrust".

Signed and Sealed this

Sixteenth Day of February 1982

[SEAL]

Attest:

GERALD J. MOSSINGHOFF

*Attesting Officer*   *Commissioner of Patents and Trademarks*